United States Patent Office 2,758,926
Patented Aug. 14, 1956

2,758,926
NORMALLY FOAM-PRODUCING BEVERAGES

Harry A. Toulmin, Jr., Dayton, Ohio, assignor to The Commonwealth Engineering Company of Ohio, Dayton, Ohio, a corporation of Ohio No Drawing. Application July 7, 1953,
Serial No. 366,634

7 Claims. (Cl. 99—48)

This invention relates to normally foam-producing beverages and particularly to fermented malt beverages having the characteristic that they form a stable, long-lasting foam.

Fermented malt beverages such as beer, ale, porter, stout, etc. are evaluated for excellence by their body, palatability, appearance, including color and clarity, and on the foam head formed when the beverage is poured. Beer, the most widely consumed malt beverage, is more highly prized when it forms a substantial volume of persistent foam on being poured.

It is relatively simple to insure the initial formation of a large volume of foam when beer or the like is poured because this can be effected by controlling the extent of carbonation as well as the manner in which the beer is poured. However, past attempts to insure the formation of an enduring foam which maintains its head for the time, often many minutes, required for consumption of the beverage have invariably had adverse effects on other properties of the beer or the like, such as the brilliancy, taste or flavor.

Foaming of beer results from the presence therein of certain proteins, gums, hop resins, minute traces of esters, organic acids and higher alcohols, which bring about a lowering of the surface tension and, at the surface of the beer, induce the formation of a firm, interlocking network which entangles or entraps the gas bubbles as they float to the surface. A viscous envelope or protective film is formed around the small gas bubbles by these proteins, gums, etc., preventing their coalescence into larger bubbles having a disrupting effect on the foam. Stabilization of the gas bubbles brought about by the formation of a protective film of the substances occurring naturally in the malt beverage on the individual bubbles makes for a more enduring foam than is produced in carbonated soft drinks. However, the stabilizing effect of the film-forming components present in beer and other malt beverages is not sufficiently pronounced to prolong the life of the foam for more than a few seconds, and the search has continued among the brewers for stabilizers capable of prolonging the duration of the foam without having an adverse effect on the clarity or other desirable qualities of the beverage.

A primary object of this invention is to provide fermented malt beverages which form a more enduring foam-head than is produced by the gas bubble-protecting components normally present in the beverage.

This and other objects of the invention are accomplished by adding to fermented malt beverages such as beer and the like, at any suitable stage in their manufacture, and preferably after the fermenting and initial or coarse filtering and prior to storage, a small quantity of a water-soluble carboxyalkyl dextran, and particularly carboxymethyl dextran.

Dextrans are high molecular weight branched polysaccharides comprising anhydroglucopyranosidic units and characterized by the fact that these units are joined by molecular structural repeating linkages some, and apparently at least 50% of which, are alpha-1,6 linkages, the remaining linkages being of non-alpha-1,6 type. Dextran may vary with respect to its molecular weight, molecular structural repeating alpha-1,6 to non-alpha-1,6 linkages ratios, sensitivity to water and osmotic pressure in liquids. The stabilizing agents for the fermented malt beverages of this invention are water-soluble and may be derived from dextran which is itself water-soluble or from water-insoluble or substantially water-insoluble dextran which is rendered water-soluble by the introduction of the solubilizing carboxyalkyl, more specifically, carboxymethyl group.

Dextran suitable for carboxymethylation to produce the stabilizing agents for the fermented malt beverages may be produced in any suitable way. For example, the dextran may be produced microbiologically, as by inoculating, with suitable selected bacteria, a sucrose-bearing medium containing particular nitrogenous substances and certain inorganic salts, and incubating the inoculated medium at the temperature most favorable to the growth of the particular microorganism. For instance, the dextran may be obtained by inoculating an aqueous medium containing 5–10% of sucrose, 0.5% peptone, 0.5% dipotassium phosphate, 0.1% of sodium chloride and 0.005% of manganous sulfate (adjusted to a pH between about 6.5 and about 7.5, preferably 7.2, and sterilized) with *Leuconostoc mesenteroides* B-512 (Northern Regional Research Laboratory classification), and incubating the inoculated medium at 20–25° C. until the maximum dextran production is attained, after which the dextran may be precipitated from the culture medium by adjusting the pH to 7.0–8.0, for instance with calcium chloride, which aids in the precipitation of phosphates, and adding acetone or a water-miscible lower aliphatic alcohol, such as methanol, ethanol, or isopropanol to the medium to precipitate the dextran. To effect complete precipitation of the dextran, it may be desirable to allow the medium comprising the added precipitant to stand for a relatively long period, such as about 6 hours. For the present purposes a pure or substantially pure dextran is desirable and therefore the material precipitated as described is washed free of occluded bacteria, enzyme, nitrogenous and inorganic materials precipitated before it is finally dried. A purer dextran, comprising lesser amounts of occluded contaminants, may be obtained by adding the precipitant alcohol to the fermentate at a pH of 2.5–4.5. The dextran thus precipitated may be further purified by one or more re-precipitations with the alcohol.

The purified dextran may be dried as by drum-drying to obtain a fluffy product which is then reduced to a powder, the preferred form for use in the carboxymethylating reaction. Or a powder may be obtained directly by spray-drying or by lyophilization.

The dextran thus produced is a so-called "native" dextran which is soluble in water, and of very high molecular weight calculated to be in the millions. This dextran, or other initially water-soluble high molecular weight dextrans, such as those obtained using the microorganisms bearing the following NRRL classifications: *Leuconostoc mesenteroides* B-119, B-1146 and B-1190, may be carboxyalkylated to obtain effective stabilizing agents for the fermented malt beverages. Also, "native" dextrans which are initially water-insoluble or substantially water-insoluble, such as those obtained using the microorganisms *Leuconostoc mesenteroides* B-742, B-1191, B-1196, B-1208, B-1216, B-1120, B-1144, B-523, *Streptobacterium dextranicum* B-1254 and *Betabacterium vermiforme* B-1139, and which are rendered water-soluble by carboxymethylation, may be used.

The dextran carboxymethylated to obtain the foam-stabilizers of the invention need not be one produced by the method described, which is merely illustrative. It may be a dextran of any molecular weight obtained under conditions other than those described such as by enzyme action in the substantial absence of bacteria, as by cultivating a selected bacterium, such as *Leuconostoc mesenteroides* B-512 to obtain a dextran-producing enzyme, separating the enzyme from the medium in which it is produced, and introducing the enzyme into a medium in which dextran is produced by the action of the enzyme. The dextran may also be produced by methods involving the bacterial conversion of 1,4 linkages of dextrins to the 1,6 bonds of dextran, or by any other feasible method.

Also, the dextran is not limited to "native" products or dextrans having high molecular weights equivalent to or approximating that of microbiologically produced "native" dextran, since dextrans having molecular weights between 5,000 and $150 \times 10^6$, as determined by light scattering measurements are useful. Low or comparatively low molecular weight dextran may be obtained directly or by hydrolyzing, by means of acid or enzymatically, a dextran of relatively high molecular weight. The hydrolysis product may be fractionated, if desired. The dextran carboxymethylated may be a so-called "clinical" dextran such as is used as a blood plasma extender.

The carboxyalkyl dextrans may be obtained by reacting the dextran and a carboxyalkylating agent in an aqueous alkaline medium whereby the carboxyalkyl group is substituted for the hydrogen atom of one or more hydroxyl groups in the dextran molecule. Carboxyalkyl dextrans containing an average of from less than 1.0 to 3.0 carboxyalkyl groups per anhydroglucopyranosidic unit may be obtained by appropriate selection and correlation of the reaction conditions, including the particular carboxyalkylating agent, the proportion of carboxyalkylating agent to dextran, and the time and temperature of the reaction. In general, for given relative proportions of dextran and the carboxyalkylating agent, longer reaction times and higher reaction temperatures result in more highly substituted ethers. The presently preferred foam-stabilizer is carboxymethyl dextran.

The carboxymethyl dextran may be obtained by reacting dextran with a carboxymethylating agent such as chloracetic acid, sodium chloracetate or chloracetamide, the reaction being carried out in aqueous medium, under alkaline conditions, i. e., in the presence of an aqueous solution of a strong alkali metal hydroxide, such as sodium, potassium or lithium hydroxide.

According to one method, the carboxymethyl dextran is produced by treating the dextran, in aqueous solution or suspension, with an excess of sodium or potassium hydroxide at a temperature from 50°–100° C. for a time ranging from about ten minutes to about two hours. Preferably, the molar ratio of sodium chloracetate or potassium chloracetate to dextran is between 2:1 and 12:1; the molar ratio of sodium hydroxide or potassium hydroxide to dextran is between 5:1 and 15:1; and the molar ratio of the water to dextran is between 70:1 and 120:1.

This reaction results in the production of a viscous mass comprising the sodium or potassium salt of the carboxymethyl dextran. The viscous mass comprising the alkali metal salt of the ether may be precipitated from the reaction mass by a non-solvent for the salt, for example by means of any alcohol which is completely miscible with water, such as methyl, ethyl, propyl, isopropyl, or t. butyl, or the salt of the ether may be precipitated from the reaction mixture by means of other organic, water-miscible solvents which are non-solvents for the ether salt, such as, for instance, acetone.

The precipitated crude sodium or potassium carboxymethyl dextran thus precipitated may be converted to the free carboxymethyl dextran by mixing it with water, acidifying the mixture to a pH of about 2.0, precipitating the carboxymethyl dextran by means of acetone or a water-miscible alcohol as described above. In recovering the free carboxymethyl dextran from the alkali metal salt, it is not essential to acidify the mixture of the salt with water to a pH of 2.0, since other pH values on the acid side may be used. However, it has been found that the highest yields of the free ether are generally obtained by precipitation of the ether from an aqueous solution or dispersion of the salt which has been acidified, for example by means of hydrochloric acid, to pH 2.0

It will be observed from the foregoing discussion that the preferred carboxymethylating agent is chloracetic acid used in the form of its sodium or potassium salt. The sodium or potassium chloracetate is formed before the carboxymethylating agent is added to the aqueous solution or suspension of the dextran, so that the sodium or potassium salt will not be formed during the reaction in the strongly basic solution required for the production of the carboxymethyl dextran, and thereby result in a lowering of the yield of the carboxymethyl dextran salt. The sodium or potassium salt of the chloracetic acid is obtained by neutralizing the chloracetic acid by means of sodium or potassium carbonate in aqueous solution maintained at low temperature and preferably between 0° and 50° C. with constant stirring. The relatively low temperature is employed for the neutralization in order to minimize the tendency of the sodium or potassium chloracetate formed as a result of the neutralization to undergo hydrolysis. The use of the pre-formed sodium or potassium salt of the chloracetic acid favors the carboxymethylating reaction and results in increased yields of the carboxymethyl dextran.

In order to further minimize the tendency of the sodium or potassium chloracetate to undergo hydrolysis in the aqueous alkaline medium necessary to the carboxymethylating reaction, the sodium or potassium hydroxide is preferably added to the sodium or potassium chloracetate dissolved in water, rather than in the reverse order. The alkali may be dissolved in water prior to its addition to the chloracetate solution. This procedure facilitates temperature control because the heat of solution of the alkali can be dissipated before the reaction takes place.

The mass comprising the dextran dissolved or suspended in the aqueous alkaline solution of the sodium or potassium chloracetate is stirred vigorously throughout the reaction, such stirring being particularly important when the mass is a heterogeneous system comprising a water-insoluble dextran.

Carboxyalkyl dextrans in which the alkyl portion of the carboxyalkyl group contains from 1 to 5 carbon atoms may be used as foam-stabilizers in accordance with this invention and methods for producing suitable stabilizers are exemplified in detail in the pending application of M. J. Hiler, Serial No. 327,938, filed December 24, 1952, and of L. J. Novak et al., Serial No. 346,016, filed March 31, 1953.

The carboxymethyl dextrans, which occur as white powders, are non-toxic, essentially odorless and tasteless materials that do not induce turbidity in the fermented malt beverages even after long standing. They may be added directly to beer, for example, at any stage in its manufacture, such as to the mash prior to fermentation, during fermentation, or after the fermentation has been concluded. It will usually be found preferable to add the carboxymethyl dextran after the fermentation is completed and the initial or coarse filtration has been performed, in order to avoid loss of the stabilizer by adsorption or absorption thereof by, or occlusion to, the yeast and other solid material retained on the filter. Desirably, the carboxyalkyl dextran may be added to the fermented beverage in the period after completion of the fermentation and prior to final filtration thereof. The carboxymethyl dextran is preferably used in the form of an aqueous solution having a concentration which may be varied but is usually such that from 0.5 to 20 parts of the carboxymethyl dextran is added per 100 parts of the fermented beverage.

The aqueous solution of the carboxymethyl dextran may be homogenized in a colloid mill prior to being added to the fermented beverage, if desired, but such precautions are not usually necessary.

The following examples will illustrate specific embodiments of the invention. These examples are given for purposes of illustration and are not to be interpreted as limitative.

*Example I*

Beer is fermented in the usual way and filtered through a coarse filter. For each 100 parts by weight of the fermented beer there are added 5 parts by weight of a 1% aqueous solution of carboxymethyl dextran containing an average of 2.8 carboxymethyl groups per anhydroglucopyranosidic unit and derived from a "native" microbiologically produced B-512 high molecular weight dextran. The mixture is allowed to stand for 48-76 hours and then filtered with the aid of diatomaceous earth, a clear solution of excellent color being obtained. On pouring, the beer forms a stable, voluminous foam.

*Example II*

Beer is fermented as usual and filtered clear. For each 100 parts by weight of the filtrate there is added 10 parts of a 2% aqueous solution of carboxymethyl dextran containing an average of about 1.9 carboxymethyl groups per anhydroglucopyranosidic unit and derived from dextran having a molecular weight between 20,000 and 100,000. The beer may be refiltered if desired.

The carboxymethyl dextran evidently functions by forming a film on the gas bubbles which rise to the surface of the beverage, the film serving to shield the bubbles and prevent their coalescence, and to enhance the protective or shielding action of the film-forming components occurring naturally in the beverage, to thus prolong the time during which the small bubbles retain their individuality and thereby extend the life of the foam-head. The carboxymethyl dextrans derived from dextrans of biological origin are safe for human consumption and do not produce untoward physiological effects. They do not unfavorably influence the flavor or color of the beverage and insofar as they influence palatability tend to improve it by imparting greater smoothness to the beverage.

It will be understood that while certain specific embodiments of the invention have been discussed, it is not intended to limit or circumscribe the invention by the details given in view of the fact that modifications and changes may be made in carrying out the invention which are within the scope of this disclosure and of the appended claims. Thus, although the invention has been discussed in detail as practiced in connection with beer, it will be understood that it is concerned with fermented malt beverages as a class and, in general, with improving the foam characteristics of normally foam-producing beverages.

I claim:

1. A normally foam-producing beverage containing, for prolonging the life of the foam, about 0.5 part of a carboxymethyl ether of native, water-soluble, microbiologically produced dextran per 100 parts of the beverage.

2. A fermented malt beverage containing, for prolonging the life of the foam produced by the beverage, about 0.5 part of a carboxymethyl ether of native, water-soluble, microbiologically produced dextran per 100 parts of the beverage.

3. Beer containing, for prolonging the life of the foam produced by the beer, about 0.5 part of a carboxymethyl ether of native, water-soluble, microbiologically produced dextran per 100 parts of the beer.

4. The method of prolonging the life of the foam produced by normally foam-producing beverages, which comprises incorporating in the beverage, at any stage in its manufacture, about 0.5 part of a carboxymethyl ether of native, water-soluble, microbiologically produced dextran per 100 parts of the beverage.

5. The method of prolonging the life of the foam produced by fermented malt beverages which comprises incorporating in the beverage, at any stage in its manufacture, about 0.5 part of a carboxymethyl ether of native, water-soluble, microbiologically produced dextran per 100 parts of the beverage.

6. The method of prolonging the life of foam produced by beer which comprises incorporating in the beer, at any stage in the manufacture thereof between preparation of the mash and storage of the fermented beverage, about 0.5 part of a carboxymethyl ether of native, water-soluble, microbiologically produced dextran per 100 parts of the beer.

7. The method of claim 6, characterized in that an aqueous solution of the carboxymethyl dextran is incorporated in the fermented beer after initial coarse filtration of the fermentate and prior to final filtration thereof.

References Cited in the file of this patent

UNITED STATES PATENTS

| | | |
|---|---|---|
| 2,089,217 | Mahoney | Dec. 29, 1934 |
| 2,409,816 | Wadsworth | Oct. 22, 1946 |
| 2,602,082 | Owen | July 1, 1952 |
| 2,609,368 | Gaver | Sept. 2, 1952 |

OTHER REFERENCES

"Bacterial Polysaccharides" by T. H. Evans and H. Hibbert, Scientific Report Series No. 6, Sugar Research Foundation, Inc., New York, April 1947, pages 216 to 219.